United States Patent [19]

Woolley

[11] 4,187,092

[45] Feb. 5, 1980

[54] METHOD AND APPARATUS FOR PROVIDING INCREASED THERMAL CONDUCTIVITY AND HEAT CAPACITY TO A PRESSURE VESSEL CONTAINING A HYDRIDE-FORMING METAL MATERIAL

[75] Inventor: Ronald L. Woolley, Orem, Utah

[73] Assignee: Billings Energy Corporation, Provo, Utah

[21] Appl. No.: 906,089

[22] Filed: May 15, 1978

[51] Int. Cl.² ............................................. F17C 11/00
[52] U.S. Cl. .......................................... 62/48; 34/15; 423/248
[58] Field of Search ................ 62/48; 34/15; 423/248; 123/DIG. 12

[56] References Cited

U.S. PATENT DOCUMENTS

| 2,662,379 | 12/1953 | Reich | 62/48 |
| 3,108,445 | 10/1963 | Portzer et al. | 62/48 |
| 3,732,690 | 5/1973 | Meijer | 123/DIG. 12 |

Primary Examiner—Ronald C. Capossela
Attorney, Agent, or Firm—Calvin E. Thorpe

[57] ABSTRACT

A method and apparatus are disclosed for providing increased thermal conductivity and heat capacity to a pressure vessel containing a hydride-forming metal material which is capable of absorbing and storing relatively large amounts of hydrogen gas. An elongate pressure vessel, having an opening therein for charging and discharging hydrogen therefrom and valve means in combination with the opening for controlling flow of hydrogen gas to and from the container, is provided with a plurality of elongate, aluminum magnesium, or copper tubes as a tube bundle, with the longitudinal axis of the tubes being parallel to the longitudinal axis of the vessel. The tubes are packed in the vessel so that tubes are in firm contact with adjacent tubes, and the outer tubes of the bundle are in firm contact with the longitudinal inside surfaces of the vessel as well as with adjacent tubes in the bundle. Particulate, hydride-forming, metal material substantially fills the otherwise void spaces within the tube-containing vessel. Thermal conductivity and thermal capacity of the bed of particulate material in the tube-containing vessels are increased by as much as 240% and 15%, respectively, in comparison to equivalent size beds of the same particulate material in non-tube containing vessels.

An existing pressure vessel can be retrofitted with the tightly packed tubes by cutting tubes, having an outside diameter smaller than the valve opening in the pressure vessel, to lengths having a longitudinal dimension shorter than the longitudinal dimension of the pressure vessel. The lengths of tubes are inserted, one at a time, into the pressure vessel through the valve opening therein, and the inserted tubes are organized into the tightly packed tube bundle.

7 Claims, 3 Drawing Figures

METHOD AND APPARATUS FOR PROVIDING INCREASED THERMAL CONDUCTIVITY AND HEAT CAPACITY TO A PRESSURE VESSEL CONTAINING A HYDRIDE-FORMING METAL MATERIAL

BACKGROUND OF THE INVENTION

1. Field

This invention pertains to the storage of hydrogen in the form of solid metal hydrides contained in appropriate containers, e.g., pressure vessels. In particular, the invention relates to methods and apparatus for increasing the thermal conductivity and thermal capacity of the bed of particulate metal hydrides contained in the storage containers.

2. State of the Art

One factor that has limited the use of hydrogen, especially as a fuel, is the difficulty of efficiently and safely storing it. Storage as a liquid is costly due to the energy expended in liquifying the hydrogen, and the extremely low temperature of the liquid hydrogen presents numerous safety problems. Storing hydrogen as a gas requires extremely heavy and bulky containers and is impractical for many contemplated uses of hydrogen.

An attractive alternative to the conventional storage methods has been recently proposed in which hydrogen is stored in the form of a metallic hydride. Many metals and alloys will reversibly react with hydrogen to form metallic hydride which contain more hydrogen per unit volume than liquid hydrogen. Heat is liberated when the hydrogen and metallic material reacts to form the hydrides and must be removed to allow the hydriding reactions to proceed to completion. Conversely, heat is absorbed during the decomposition of the hydride to release hydrogen, and the hydrides are preferably heated during their decomposition to provide an adequate rate of liberatation of hydrogen therefrom.

Heating and cooling of the metallic hydride material has been accomplished by conventional techniques including heating or cooling the container in which the material is held, or spacing tubes throughout the bed of hydride material and circulating a heat exchange medium in the tubes. In such techniques, the amount of heat transferred to the metallic hydride depend on the conductive heat transfer characteristics of the particulate, metal material. Unfortunately, particulate, metal hydride materials are poor conductors of heat. The rather low thermal conductivities of beds of such material imposes severe limitations on the design of such storage containers.

OBJECTIVES

The primary objective of the present invention was to provide a method and apparatus for increasing the thermal conductivity of beds of particulate, metal hydride materials contained in pressure vessels, and in particular to modifying existing pressure vessels so as to achieve the increase in thermal conductivity without effecting the certification of such vessels. Another objective was to provide for increased thermal capacity of the beds of metal hydride contained in the pressure vessels.

SUMMARY OF THE INVENTION

The above objectives are achieved, in accordance with the present invention, by providing a hydrogen storage system comprising an elongate pressure vessel containing a plurality of aluminum, magnesium, or copper tubes positioned therein to form a coherent, tightly packed, tube bundle in which the outer tubes thereof also make firm contact with the inside surface of the vessel. Particulate, hydride-forming metal material substantially fills the otherwise void spaces within the tube-containing vessel.

The tube-containing vessel is advantageously made from an existing certified pressure vessel in which the tubes are retrofitted. Throughout the specification, the term "certified pressure vessel" and "certification" refer to vessels which have been constructed and tested in accordance with a particular code as established by a regulatory agency, such as state or federal agencies, or A.S.M.E., etc. In retrofitting an existing, certified vessel, the valve means is removed from the opening in the vessel, and aluminum, magnesium, or copper tubes, having an outside diameter smaller than the opening in the vessel, are cut into lengths which are at least slightly shorter than the longitudinal dimension of the vessel. The tubes are inserted, one at a time, into the vessel through the opening therein. The tubes are arranged arranged into a tube bundle, with the longitudinal axis of each tube in the bundle being parallel to the longitudinal axis of the vessel. The tubes are forced into the vessel to form a firmly packed tube bundle in which each tube is in firm contact along its longitudinal surface with the longitudinal surfaces of at least three other tubes, and in which the outer tubes also make firm contact along their longitudinal surfaces with the longitudinal inside surface of the vessel.

The void spaces remaining in the vessel following the installation of the tube bundle therein is subsequently substantially filled with particulate, hydride-forming metal material, and the valve means is then replaced in the opening of the vessel. The hydride-forming metal material is a metal or metal alloy which is capable of reacting with and absorbing hydrogen gas at a given temperature and pressure and thereafter releasing the hydrogen gas when the pressure is reduced and/or the temperature of the material is increased, i.e., hydrogen is absorbed when the partial pressure of hydrogen is greater than the equilibrium pressure associated with the hydride forming metal material and is released when the partial pressure of hydrogen is less than the equilibrium pressure associated with such material. Preferably, the metal hydride is an alloy comprising at least two elements selected from the group consisting of iron, titanium, nickel, calcium, magnesium, manganese, and rare earth elements. Particularly advantageous alloys include iron-titanium alloys, lanthanum-nickel alloys, calcium-nickel alloys, mishmetal-nickel alloys, manganese-nickel alloys, and mischmetal-calcium-nickel alloys. Mischmetal is the common name given to a mixture of rare earth elements.

Thermal conductivity and thermal capacity of the bed of hydride-forming material in the vessel of the present invention are increased by as much as or more than 240% and 15%, respectively, in comparison to equivalent size beds of the same particulate material in conventional, non-tube containing vessels.

THE DRAWINGS

A particular embodiment of the present invention representing the best mode presently contemplated of carrying out the invention is illustrated in the accompanying drawings, in which.

DETAILED DESCRIPTION OF THE ILLUSTRATED EMBODIMENTS

Figure 1:
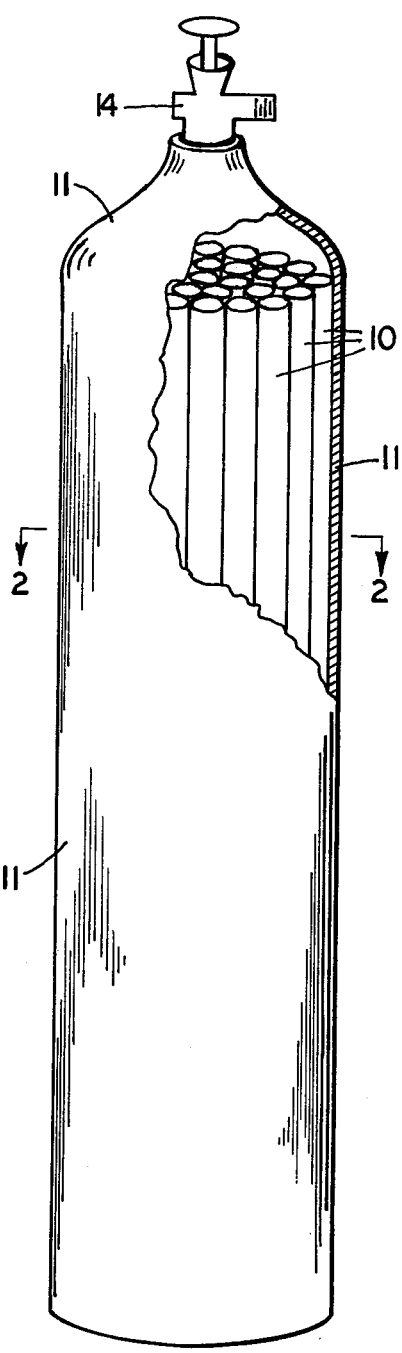
FIG. 1 is perspective view of a pressure vessel in accordance with the invention, with the side wall of the vessel being broken away to show the tube bundle therein.
Figure 2:
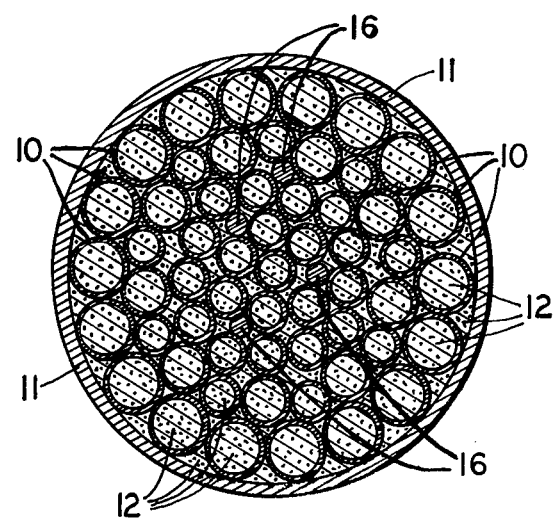
FIG. 2 is a cross sectional view taken on line 2—2 of FIG. 1.
Figure 3:
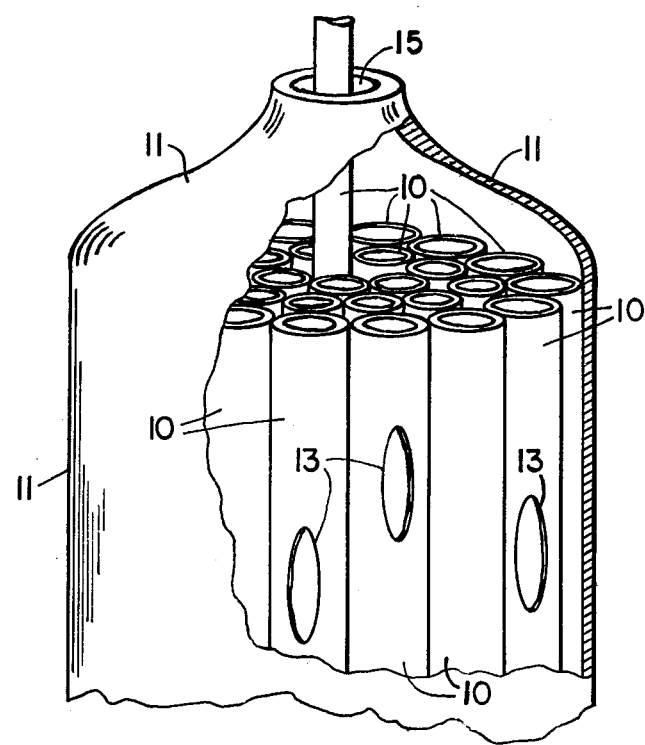
FIG. 3 is a partial perspective of a vessel similar to the one shown in FIG. 1, showing one of the last tubes to be forced into the tube bundle through the valve opening of the vessel.

As illustrated in FIGS. 1-3, a plurality of tubes 10 are positioned within a pressure vessel 11 to form a coherent, tightly packed bundle, wherein the longitudinal axes of the tubes 10 are parallel to the longitudinal axis of the vessel 11. The tubes are preferably thin walled and made of aluminum, copper, or magnesium to avoid any problem with interaction between the tubes and the hydrogen atmosphere within the vessel 11. The vessel 11 can be made of aluminum, copper, stainless steel, carbon steel, and other metals when properly designed in accordance with known technology (see Hydrogen-Environment Embrittlement of Metals, a NASA Technology Survey by Robert P. Jewett, Robert J. Walter, Willis T. Chandler, and Richard P. Frohmberg, NASA Tech Brief B73-10168, June 1973).

The tubes 10 are packed firmly into a bundle within the vessel 10 so that each tube in the bundle is in firm contact along its longitudinal surface with the longitudinal surfaces of at least three other tubes. In addition, the outer tubes in the bundle make firm contact along their longitudinal surfaces with the longitudinal inside surface of said vessel.

The otherwise void spaces remaining in the vessel 11 containing the tubes 10 is substantially filled with a particulate, hydride-forming, metal material 12 (see FIG. 2). The metal material 12 is capable of reacting with and absorbing hydrogen gas under conditions in which the hydrogen gas in the vessel 11 has a partial pressure greater than the equilibrium pressure of the material 12 and of subsequently releasing hydrogen gas when the partial pressure of hydrogen in the vessel 11 is less than the equilibrium pressure of the metal material 12. The equilibrium pressure of the metal material 12 can be increased by heating the material 12, and, of course, lowering of pressure in the vessel below the equilibrium pressure results in the release of hydrogen from the metal material 12.

To facilitate filling of the otherwise void spaces with metal material 12, a plurality of spaced apart notches 13 (see FIG. 3) are provided in the longitudinal sides of each of the tubes 10. The notches 13 are arranged randomly around each tube to provide a plurality of access openings to the interior of each tube 10. The notches 13 allow particulate material 12 to flow to and from the interior of the tubes 10 and the spaces between tubes, thereby facilitating the filling of the void spaces with the particulate material 12.

A conventional pressure valve 14 is connected to the valve opening to control inflow and outflow of hydrogen gas from the vessel 11.

The tubes 10 can be positioned within the vessel 11 during the manufacture of the vessel 11, or, as will be further explained hereinafter, the tubes can be retrofitted in an existing pressure vessel 11. If positioned in the vessel 11 during the construction of the vessel, the tubes 10 are inserted through the open end of the vessel prior to the rolling down of that end to form the valve opening therein. This entails having the full bundle of tubes 10 in the vessel 11 during the rolling and forming of the valve opening.

It is advantageous to retrofit the tubes 10 into a completely formed pressure vessel, thus avoiding interposing the step of inserting the tubes 10 into the vessel during the manufacturing of the vessel.

Tubes 10 are readily inserted into the vessel 11 through the valve opening 15 (see FIG. 3). The tubes 10 made of aluminum, magnesium, or copper are cut to lengths having a longitudinal dimension shorter than the longitudinal dimension of the pressure vessel 11. The lengths of tubes 10 are then inserted one at a time into the pressure vessel 11 through the valve opening 15 therein.

The tubes 10 are organized into a tightly packed tube bundle as best illustrated in FIG. 2. Adjacent tubes 10 are in firm contact along the longitudinal sides thereof, and the outer tubes 10 of the bundle also make firm contact along their longitudinal surfaces with the longitudinal, inside surface of the vessel 11. To achieve optimum packing of the tubes 10 into the tube bundle, the initial tubes which are insulated into the vessel 11 have an outside diameter just smaller than the valve opening 15 in the pressure vessel. These tubes are positioned substantially around the interior surface of the vessel (see FIG. 2). Tubes having smaller outside diameters are then inserted into the vessel to form the next course of tubes, with each course of tubes being slightly smaller than the previous course. By utilizing such a procedure, a tightly packed tube bundle can be achieved in which the packing of the outer tubes closely approaches being hexagonal, and the tubes near the center of the bundle contact at least five adjacent tubes. The last several tubes, i.e. the last two or three, forced into the tube bundle to compress the tube bundle as much as possible. In addition, several solid rods 16 (FIG. 2) of appropriate diameter are advantageously forced into the center part of the tube bundle after all the tubes which can feasibly be forced into the bundle have been inserted. The rods 16 further compress the tubes in the tube bundle so that optimum contact is achieved between adjacent tubes in the bundle.

Following installation of the tubes 10 in the pressure vessel 11, the particulate, hydride-forming metal material 12 is introduced into the vessel 11 through the valve opening 15. Sufficient particulate material 12 is added to the vessel 11 to substantially fill the otherwise void spaces therein, i.e., the volume within the tubes and the spaces between adjacent tubes.

Whereas this invention is described with respect to particular embodiments, it is to be understood that changes may be made therein and other embodiments constructed without departing from the novel inventive concepts set forth herein and in the claims which follow.

I claim:

1. A hydrogen storage system comprising:
    an elongate pressure vessel having an opening therein for charging hydrogen to the vessel and for withdrawing hydrogen from the vessel;
    valve means in combination with the opening in said vessel for controlling the flow of hydrogen gas to and from said vessel;
    a plurality of elongate tubes being made of a metal selected from the group consisting of aluminum, magnesium, and copper, and being positioned within said pressure vessel with the longitudinal axes of said tubes being parallel to the longitudinal axis of said vessel, each of said tubes being in firm contact along its longitudinal surface with the longitudinal surfaces of at least three other tubes to form a coherent, tightly packed tube bundle in which the outer tubes thereof also make firm contact along their longitudinal surfaces with the longitudinal inside surface of said vessel; and particulate, hydride-forming, metal material substantially filling the otherwise void spaces within said vessel, said metal material being capable of reacting with and absorbing hydrogen gas at a given temperature and pressure and thereafter releasing the hydrogen gas when the pressure on the hydrogen-containing material is reduced and/or the temperature of the hydrogen-containing material is increased.

2. A hydrogen storage system in accordance with claim 1, wherein each of the tubes is provided with a plurality of spaced apart notches in the longitudinal sides thereof to facilitate filling of the hollow interiors of the tubes and spaces between tubes with said particulate, metal material.

3. A hydrogen storage system in accordance with claim 1, wherein said particulate, metal material is a metal alloy comprising at least two elements selected from the group consisting of iron, titanium, nickel, calcium, magnesium, manganese, and rare earth elements.

4. A hydrogen storage system in accordance with claim 3, wherein said particulate, metal material comprises an alloy selected from the group consisting of iron-titanium alloys, lanthanum-nickel alloys, calcium-nickel alloys, mischmetal-nickel alloys, manganese nickel alloys, and mischmetal-calcium-nickel alloys.

5. A method of increasing the thermal conductivity and heat capacity of a pressure vessel containing a bed of particulate, hydride-forming, metal material, said method comprising:

preparing lengths of tubes which are made of a metal selected from the group consisting of aluminum, magnesium, and copper, said tubes having a longitudinal dimension shorter than the longitudinal dimension of the pressure vessel, with said tubes also having an outside diameter smaller than the valve opening in the pressure vessel;

inserting the lengths of tubes into the pressure vessel through the valve opening therein, organizing the tubes which are inserted into said pressure vessel to form a tightly packed tube bundle in which adjacent tubes are in firm contact along the longitudinal surfaces thereof, with the outer tubes of said bundle also making firm contact along their longitudinal surfaces with the longitudinal, inside surface of said vessel; and substantially filling the otherwise void spaces in the vessel with a particulate, hydride-forming, metal material which is capable of reacting with and absorbing hydrogen gas at a given temperature and pressure and thereafter releasing the hydrogen gas when the pressure on the hydrogen-containing material is reduced and/or the temperature of the hydrogen-containing material is increased.

6. A method in accordance with claim 5, wherein the tube bundle is forced into a tightly packed configuration by inserting a series of tubes of various outside diameters into said vessel with the largest tubes having a diameter just small enough to pass through the valve opening, said largest tubes being inserted into said vessel first, followed by the next smaller tubes in order of their size, with the last tubes being forced into said vessel to compress and tighten the tube bundle therein.

7. A method in accordance with claim 6, wherein the tube bundle is forced into even tighter packed configuration by forcing solid rods thereinto between tubes subsequent to the installation of all the tubes.

* * * * *